:::

United States Patent
Bellussi et al.

(10) Patent No.: US 9,278,339 B2
(45) Date of Patent: *Mar. 8, 2016

(54) MIXED OXIDES OF TRANSITION METALS, HYDROTREATMENT CATALYSTS OBTAINED THEREFROM, AND PREPARATION PROCESS COMPRISING SOL-GEL PROCESSES

(75) Inventors: Giuseppe Bellussi, Piacenza (IT); Angela Carati, San Giuliano Milanese (IT); Maria Federica Gagliardi, Castellanza (IT); Stefano Zanardi, Trecate (IT); Marcello Marella, Venice (IT); Roberto Scattolin, Martellago (IT); Michele Tomaselli, Venice (IT)

(73) Assignee: ENI S.p.A., Rome (IT)

( * ) Notice: Subject to any disclaimer, the term of this patent is extended or adjusted under 35 U.S.C. 154(b) by 862 days.

This patent is subject to a terminal disclaimer.

(21) Appl. No.: 13/499,452

(22) PCT Filed: Sep. 23, 2010

(86) PCT No.: PCT/IB2010/002392
§ 371 (c)(1), (2), (4) Date: Jun. 11, 2012

(87) PCT Pub. No.: WO2011/039595
PCT Pub. Date: Apr. 7, 2011

(65) Prior Publication Data
US 2012/0261311 A1  Oct. 18, 2012

(30) Foreign Application Priority Data
Sep. 30, 2009  (IT) .............................. MI2009A1680

(51) Int. Cl.
| | |
|---|---|
| *B01J 21/00* | (2006.01) |
| *B01J 23/00* | (2006.01) |
| *B01J 29/00* | (2006.01) |
| *B01J 31/00* | (2006.01) |
| *B01J 27/049* | (2006.01) |

(Continued)

(52) U.S. Cl.
CPC .............. *B01J 23/002* (2013.01); *B01J 27/049* (2013.01); *B01J 27/0515* (2013.01); *B01J 35/1014* (2013.01); *B01J 35/1019* (2013.01); *B01J 35/1038* (2013.01); *B01J 37/033* (2013.01); *B01J 37/20* (2013.01); *C10G 45/08* (2013.01); *B01J 2523/00* (2013.01); *C10G 2300/107* (2013.01); *C10G 2300/1044* (2013.01); *C10G 2300/1062* (2013.01); *C10G 2300/1077* (2013.01); *C10G 2300/202* (2013.01); *C10G 2400/04* (2013.01); *C10G 2400/06* (2013.01)

(58) Field of Classification Search
USPC .................. 502/150, 100, 162, 163
See application file for complete search history.

(56) References Cited

U.S. PATENT DOCUMENTS

| | | | | |
|---|---|---|---|---|
| 3,779,903 A | * | 12/1973 | Levinson | ................. B01J 21/04 |
| | | | | 208/216 PP |
| 4,243,553 A | * | 1/1981 | Naumann | .............. B01J 27/051 |
| | | | | 423/53 |

(Continued)

FOREIGN PATENT DOCUMENTS

| | | |
|---|---|---|
| EP | 0 133 031 | 7/1988 |
| EP | 0 199 555 | 11/1992 |

(Continued)

OTHER PUBLICATIONS

International Search Report issued on Jul. 28, 2011 in PCT/IB10/002392 filed on Sep. 23, 2010.

*Primary Examiner* — James McDonough
(74) *Attorney, Agent, or Firm* — Oblon, McClelland, Maier & Neustadt, L.L.P.

(57) ABSTRACT

New sulfided metal catalysts are described, containing a metal X selected from Ni, Co and mixtures thereof, a metal Y selected from Mo, W and mixtures thereof, an element Z selected from Si, Al and mixtures thereof, and possibly an organic residue, obtained by the sulfidation of mixed oxide precursors, also new, having general formula (A) $X_aY_bZ_cO_d \cdot pC$ (A) possibly shaped without a binder, or by sulfidation of mixed oxides having formula (A), in shaped form with a binder, wherein X is selected from Ni, Co and mixtures thereof, Y is selected from Mo, W and mixtures thereof, Z is selected from Si, Al and mixtures thereof, O is oxygen, C is selected from: a nitrogenated compound N, an organic residue deriving from the partial calcination of the nitrogenated compound N, said nitrogenated compound N, when present, being selected from: a) an alkyl ammonium hydroxide having formula (I) $R^IR^{II}R^{III}R^{IV}NOH$ (I) wherein the groups $R^I$-$R^{IV}$, the same or different, are aliphatic groups containing from 1 to 7 carbon atoms, b) an amine having formula (II) $R^1R^2R^3N$ (II) wherein $R^1$ is a linear, branched or cyclic alkyl, containing from 4 to 12 carbon atoms, and $R^2$ and $R^3$, the same or different, are selected from H and a linear, branched or cyclic alkyl, containing from 4 to 12 carbon atoms, said alkyl being equal to or different from $R^1$, a, b, c, d are the number of moles of the elements X, Y, Z, O, respectively, p is the weight percentage of C with respect to the total weight of the precursor having formula (A), a, b, c, d are higher than 0 a/b is higher than or equal to 0.3 and lower than or equal to 2, (a+b)/c is higher than or equal to 0.3 and lower than or equal to 10, preferably varying from 0.8 to 10 d=(2a+6b+Hc)/2 wherein H=4 when Z=Si H=3 when Z=Al and p is higher than or equal to 0 and lower than or equal to 40%. Said catalysts can be used as hydrotreating catalysts.

24 Claims, No Drawings

(51) Int. Cl.
*B01J 27/051* (2006.01)
*B01J 35/10* (2006.01)
*B01J 37/03* (2006.01)
*B01J 37/20* (2006.01)
*C10G 45/08* (2006.01)

(56) References Cited

U.S. PATENT DOCUMENTS 4,839,326 A * 6/1989 Halbert ................. B01J 27/049
502/168
4,960,506 A * 10/1990 Halbert ................. B01J 27/049
208/215
6,156,695 A 12/2000 Soled et al.
6,803,337 B1 * 10/2004 Zanibelli ............. B01J 29/7815
502/64
2011/0000822 A1 1/2011 Domokos et al.

FOREIGN PATENT DOCUMENTS

| EP | 1 034 841 | 9/2000 |
| WO | 99 03578 | 1/1999 |
| WO | 00 42119 | 7/2000 |
| WO | 2006 036610 | 4/2006 |
| WO | 2009 065878 | 5/2009 |

* cited by examiner

MIXED OXIDES OF TRANSITION METALS, HYDROTREATMENT CATALYSTS OBTAINED THEREFROM, AND PREPARATION PROCESS COMPRISING SOL-GEL PROCESSES

New sulfided metal catalysts are described, containing a metal X selected from Ni, Co and mixtures thereof, a metal Y selected from Mo, W and mixtures thereof, an element Z selected from Si, Al and mixtures thereof, obtained by the sulfidation of suitable precursors, wherein said precursors are new and are mixed oxides containing at least one metal selected from Ni, Co and mixtures thereof, at least one metal selected from Mo, W and mixtures thereof, at least one element selected from Si, Al and mixtures thereof, and possibly containing a nitrogenated compound or an organic residue coming from the partial calcination of the nitrogenated compound. Suitable methods are also described for the preparation of said sol-gel precursors. The catalysts obtained by the sulfidation of these precursors can be used as hydrotreatment catalysts.

It has been known since the beginning of the last century that transition metals are converted to catalytic materials of the TMS type (Transmission Metal Sulfide) in the presence of heavy oil fractions rich in sulfur. The work of M. Pier, Z. Elektrochem., 35 (1949), 291, is particularly important, after which TMS catalysts, such as $MoS_2$ and $WS_2$, became the basis of modern catalysts supported on alumina, Co and Ni acting as promoters.

TMS of the second or third transition series, such as $RuS_2$ and $Rh_2S_3$ have proved to be extremely active and stabile catalysts in hydrotreatment processes, as they are based on precious metals, however, they have not found a widespread industrial application. Consequently, in all refinery processes in which unitary hydrotreatment operations must be performed, whether they be hydrogenation or sulfur and nitrogen removal, the preferred catalysts are based on Mo and W. Furthermore, both Co and Ni are used for promoting the catalyst activity. The promoter allows an increase in the catalytic activity to be obtained, which depends on the preparation details, the type of material and other factors, but which can reach a factor 10-12 times higher with respect to that of a catalyst without a promoter (H. Topsoe, B. S. Clausen, F. E. Massoth, in Catalysis, Science and Technology, vol. 11, J. R. Anderson and M. Boudard Eds., (Springer-Verlag, Berlin 1996)).

This phenomenon is called synergetic effect and implies that the promoter and base metal act together.

The increasingly strict regulations on gaseous emissions, however, make it necessary to resort to even more highly active catalysts. In particular, in gas oil for motor vehicles, the recent European regulation envisages a sulfur content <10 ppm. To be able to go below these levels, catalysts must be found that are capable of decomposing compounds which are particularly difficult to treat, such as sterically hindered dibenzothiophenes. In addition, the catalyst must also be active with respect to compounds containing other heteroatoms, nitrogen in particular, which tend to deactivate the functionality with respect to compounds containing sulfur.

A recent development relates to the application of catalysts which comprise a non-noble metal of Group VIII and two metals of Group VIB. Catalysts of this type and the their preparation are described, for example, in patents JP 09000929, U.S. Pat. No. 4,596,785, U.S. Pat. No. 4,820,677, U.S. Pat. No. 6,299,760, U.S. Pat. No. 6,635,599, US 2007/0286781, EP 1941944. In particular, as far as the preparations are concerned, JP 09000929 describes a process for impregnation of an inorganic carrier with Co (or Ni), Mo and W. U.S. Pat. No. 4,596,785 and U.S. Pat. No. 4,820,677 describe co-precipitation techniques of the relative sulfides, which therefore require process phases in inert atmospheres. U.S. Pat. No. 6,299,760 and U.S. Pat. No. 6,635,599 describe co-precipitation methods with the use of complexing agents, from aqueous solutions heated to around 90° C. US 2007/0286781 also describes a preparation process for materials based on transition metals, using co-precipitation techniques. In patent EP 1941944, co-precipitation techniques are coupled with heating phases to relatively high temperatures.

None of these processes, however, allows an accurate control on the stoichiometry of the final material.

EP 340868 describes a sol-gel process for the preparation of a micro-mesoporous silica and alumina gel, amorphous to X-rays, having a $SiO_2/Al_2O_3$ molar ratio within the range of 30 to 500, a surface area within the range of 500 to 1,000 $m^2/g$ and a pore volume ranging from 0.3-0.6 ml/g.

U.S. Pat. No. 5,914,398 describes a sol-gel process for the preparation of a micro-mesoporous silico-alumina.

In patent EP 0972568, a sol-gel process is described for obtaining a catalyst containing molybdenum with a surface area ranging from 20 to 400 $m^2/g$ and a Mo/Si molar ratio >0.2, exemplified up to 4.5. This is a specific catalyst for the isomerization of n-paraffins.

It has now been found that, through a particular and calibrated sol-gel synthesis, it is possible to prepare mixed oxides containing suitable transition metals (TM) of Groups VIII and VIB and containing silicon and/or aluminium, in a too high TM/Si or TM/Al molar ratio, at the same time maintaining high values of the specific surface areas and total pore volume. The preparation of all these mixed oxides is effected through the synthesis of precursors containing a gelling agent. These precursors containing the gelling agent, and the mixed oxides obtained therefrom, possibly after shaping process, are transformed "in situ" into the relative sulfides, i.e. in the same environment in which the hydrotreatment is effected, or "ex situ". The sulfides thus obtained are active as catalysts in hydrotreatment processes, in particular simultaneous hydrosulfurization and hydrodenitrification processes.

A first object of the present invention therefore relates to new mixed oxides, which can be used, after sulfidation, as hydrotreatment catalyst, having general formula (A):

$$X_aY_bZ_cO_d \cdot pC \qquad (A)$$

possibly shaped without a binder,
wherein X is selected from Ni, Co and mixtures thereof,
Y is selected from Mo, W and mixtures thereof,
Z is selected from Si, Al and mixtures thereof,
O is oxygen,
C is selected from:
   a nitrogenated compound N,
   an organic residue deriving from the partial calcination of the nitrogenated compound N,
wherein said nitrogenated compound N is selected from:
a) an alkyl ammonium hydroxide having formula (I)

$$R^I R^{II} R^{III} R^{IV} NOH \qquad (I)$$

wherein the groups $R^I$, $R^{II}$, $R^{III}$ and $R^{IV}$, the same or different, are aliphatic groups containing from 1 to 7 carbon atoms,
b) an amine having formula (II)

$$R^1 R^2 R^3 N \qquad (II)$$

wherein $R^1$ is a linear, branched or cyclic alkyl, containing from 4 to 12 carbon atoms, and $R^2$ and $R^3$, the same or different, are selected from H and a linear, branched or cyclic alkyl, containing from 4 to 12 carbon atoms, said alkyl being equal to or different from $R^1$, a, b, c, d are the number of moles of the elements X, Y, Z, O, respectively, p is the weight percentage of C with respect to the total weight of the compound having formula (A), a, b, c, d are higher than 0 a/b is higher than or equal to 0.3 and lower than or equal to 2, (a+b)/c is higher than or equal to 0.3 and lower than or equal to 10, preferably varying from 0.8 to 10

$$d=(2a+6b+Hc)/2$$

wherein

H=4 when Z=Si

H=3 when Z=Al and p is higher than or equal to 0 and lower than or equal to 40%.

The organic residues deriving from the nitrogenated compounds N by partial calcination, are residues containing carbon and nitrogen.

When C is the nitrogenated compound N, its weight percentage preferably ranges from 10 to 35%; when C is the organic residue deriving from the partial calcination of the nitrogenated compound N, its weight percentage is preferably higher than 0 and lower than or equal to 25%.

Compounds having formula (A) shaped without a binder refer to compounds having formula (A) in the form suitable for being industrially used in a reactor and without the addition of a binder, i.e. without the use of a binder during the shaping procedure.

All shaping techniques without a binder can be used for this purpose. Particular new shaping techniques are described hereunder.

The compounds having formula (A) are transformed into the relative sulfides, active as hydrotreatment catalysts, by means of sulfidation: the sulfided metal compounds, called (A)S, containing a metal X selected from Ni, Co and mixtures thereof, a metal Y selected from Mo and W and mixtures thereof, an element Z selected from Si, Al and mixtures thereof, and possibly an organic residue, obtained by sulfidation of the precursor compounds having formula (A), possibly shaped without a binder, or precursor having formula (A) in shaped form with a binder, are, in turn, new and represent a further object of the present invention.

Hydrotreatment refers to a process in which a hydrocarbon feed is converted in contact with hydrogen, at a high temperature and pressure. During the hydrotreatment, various reactions can take place, for example, hydrogenation, or isomerization, hydrodesulfurization, hydrodenitrogenation, according to the catalytic system and operating conditions used. The sulfided catalysts of the present invention, obtained by sulfidation of the precursors having formula (A), are active in hydrotreatment and particularly selective in hydrodesulfurization and hydrodenitrogenation reactions.

A particular object of the present invention relates to new mixed oxides which can be used, after sulfidation, as hydrotreatment catalysts, having the general molar formula (A1):

$$X_aY_bZ_cO_d \quad (A1)$$

possibly shaped without a binder, wherein X is selected from Ni, Co and mixtures thereof, Y is selected from Mo, W and mixtures thereof, Z is selected from Si, Al and mixtures thereof, O is oxygen a, b, c, d are the number of moles of the elements X, Y, Z, O, respectively and are higher than 0 a/b is higher than or equal to 0.3 and lower than or equal to 2, (a+b)/c is higher than or equal to 0.3 and lower than or equal to 10, and preferably varies from 0.8 to 10, $$d=(2a+6b+Hc)/2$$

wherein

H=4 when Z=Si

H=3 when Z=Al

These oxides (A1) are preferably mesoporous, have a surface area, determined after thermal treatment at 550° C., higher than or equal to 70 m²/g and a pore volume higher than or equal to 0.10 ml/g.

In accordance with the IUPAC terminology "Manual of Symbols and Terminology" (1972), Appendix 2, Part I Coll. Surface Chem. Pure Appl. Chem., Vol. 31, page 578, wherein micropores are defined as pores having a diameter smaller than 2 nm, mesopores are defined as pores having a diameter ranging from 2 to 50 nm, macropores are those having a diameter larger than 50 nm, the mixed oxides of the present invention having formula (A1) are mesoporous, and are characterized by an irreversible isotherm of type IV. The average pore diameter is preferably within the range of 3 to 18 nm.

The compounds having formula (A1) are also transformed into the relative sulfides by means of sulfidation: the sulfided metal compounds, indicated as (A1)S, containing a metal X selected from Ni, Co and mixtures thereof, a metal Y selected from Mo and W and mixtures thereof, an element Z selected from Si, Al and mixtures thereof, obtained by sulfidation of the precursor compounds having formula (A1), possibly shaped without a binder, or compounds having formula (A1) in shaped form with a binder, are in turn new and represent a further object of the present invention. These particular sulfided compounds are in turn active as hydrotreatment catalysts.

Another particular object of the present invention relates to new mixed oxides, which can be used, after sulfidation, as hydrotreatment catalysts, having general formula (A2):

$$X_aY_bZ_cO_d \cdot pC \quad (A2)$$

possibly shaped without a binder, wherein X is selected from Ni, Co and mixtures thereof, Y is selected from Mo, W and mixtures thereof, Z is selected from Si, Al and mixtures thereof, O is oxygen C is selected from:

a nitrogenated compound N, an organic residue deriving from the partial calcination of the nitrogenated compound N, wherein said nitrogenated compound is selected from:

a) an alkyl ammonium hydroxide corresponding to formula (I)

$$R^IR^{II}R^{III}R^{IV}NOH \quad (I)$$

wherein the groups $R^I$, $R^{II}$, $R^{III}$ and $R^{IV}$, the same or different, are aliphatic groups containing from 1 to 7 carbon atoms, b) an amine having formula (II)

$$R^1R^2R^3N \quad (II)$$

wherein $R^1$ is a linear, branched or cyclic alkyl, containing from 4 to 12 carbon atoms and $R^2$ and $R^3$, the same or different, are selected from H and a linear, branched or cyclic alkyl, containing from 4 to 12 carbon atoms, said alkyl being equal to or different from $R^1$, a, b, c, d are the number of moles of the elements X, Y, Z, O, respectively, p is the weight percentage of C with respect to the total weight of the compound having formula (A2), a, b, c, d are higher than 0 a/b is higher than or equal to 0.3 and lower than or equal to 2, (a+b)/c is higher than or equal to 0.3 and lower than or equal to 10, preferably ranges from 0.8 to 10

$$d=(2a+6b+Hc)/2$$

wherein

H=4 when Z=Si

H=3 when Z=Al and p is higher than 0 and lower than or equal to 40%.

Said oxides (A2) are preferably mesoporous, have a surface area, determined after thermal treatment at 400° C., higher than or equal to 90 m$^2$/g and a pore volume higher than or equal to 0.18 ml/g. In particular, when Z is silicon, the surface area is preferably higher than or equal to 110 m$^2$/g and the pore volume higher than or equal to 0.20 ml/g, and when Z is Al, the surface area is preferably higher than or equal to 130 m$^2$/g and the pore volume higher than or equal to 0.30 ml/g.

The compounds having formula (A2) are also transformed into the relative sulfides by means of sulfidation: the sulfided metal compounds, indicated as (A2)S, containing a metal X selected from Ni, Co and mixtures thereof, a metal Y selected from Mo and W and mixtures thereof, an element Z selected from Si, Al and mixtures thereof, possibly an organic residue, obtained by sulfidation of the precursor compounds having formula (A2), possibly shaped without a binder, or compounds having formula (A2) in shaped form with a binder, are in turn new and represent a further object of the present invention. These particular sulfided compounds are active as hydrotreatment catalysts.

Compounds having formula (A1) and (A2) shaped without a binder refer to compounds having formula (A1) and (A2) in a form suitable for being used in a chemical reactor, without the addition of a binder, i.e. without the addition of a binder in the shaping process: said shaping process without the addition of a binder can be effected with any technique known to experts in the field. Particular shaping processes are described hereunder and are a further object of the present invention.

According to what is described above, the family of precursors having formula (A) is therefore composed of precursors having formula (A1) and (A2), the latter containing a nitrogenated compound N selected from compounds having formula (I) and (II) or an organic residue deriving from the partial calcination of the nitrogenated compound.

With reference to formulae (A), (A1) e (A2), a preferred aspect is that the nitrogenated compounds having formula (I) are tetra-alkyl ammonium hydroxides, wherein the alkyl groups, the same as each other, contain from 1 to 7 carbon atoms, or trimethylalkyl ammonium hydroxides, wherein the alkyl group contains from 1 to 7 carbon atoms. Tetrapropyl ammonium hydroxide is preferably used.

According to another preferred aspect, the nitrogenated compounds having formula (II) are selected from n-hexylamine, n-heptylamine and n-octylamine.

According to another preferred aspect, the organic residues deriving from the partial calcination of the nitrogenated compounds are residues containing carbon and nitrogen.

With reference to the formulae (A), (A1) and (A2), a preferred aspect is that X is Ni.

When, in the formulae (A), (A1) and (A2), X is a mixture of Ni and Co, the molar ratio Ni/Co preferably varies within the range of 100/1 to 1/100, even more preferably within the range of 10/1-1/10.

When Y is a mixture of Mo and W, in the formulae (A), (A1) and (A2), their molar ratio Mo/W preferably varies within the range of 100/1 to 1/100, even more preferably within the range of 10/1-1/10.

The mixed oxides having formula (A), (A1) and (A2), therefore contain, in addition to the element Z, at least one element selected from Ni and Co, and at least one element selected from Mo and W, and preferably contain at least one element selected from Ni and Co and a mixture of Mo and W. Compositions containing a mixture of Co and Ni and a mixture of Mo and W are also preferred.

Once the oxides having formula (A), (A1) and (A2), possibly shaped without a binder, or in shaped form with a binder, have been transformed into the corresponding sulfides (A)S, (A1)S and (A2)S, they become active catalysts in simultaneous hydrodesulfurization and hydrodenitrification processes.

The sulfidation of the compounds having formula (A) of the present invention, possibly shaped without a binder, or in shaped form with a binder, for obtaining the corresponding sulfided compositions which are a further object of the present invention and are active as hydrotreatment catalysts, is effected using any of the techniques known to experts in the field. In particular, the sulfidation can be carried out "ex situ" or "in situ", i.e. in the same reactor in which the hydrotreatment is subsequently effected. The sulfidation process can be carried out in a reducing atmosphere, for example consisting of H$_2$S and hydrogen, or CS$_2$ and hydrogen, at a high temperature, for example ranging from 300° to 500° C., for a period sufficient for sulfiding the starting mixed oxide, for example from 1 to 100 hours. Alternatively, the sulfidation can also be carried out using dimethyl disulfide dissolved in a hydrocarbon charge, such as naphtha or gas oil, at a temperature ranging from 300° to 500° C. Finally, the sulfidation can be carried out using the sulfur present in the charge to be treated directly, preferably at a temperature ranging from 300° to 500° C.

Sulfidation techniques which can be well used for transforming the mixed oxides of the present invention into the corresponding sulfides are also described, for example, in "Petroleum Refining", J. H. Gary, G. E. Handwerk, M. Dekker Ed. 1994.

The compounds having formula (A) of the present invention, and therefore the compounds having formula (A1) and (A2), all useful as precursors of the corresponding sulfided metallic compositions of the present invention, can be prepared simply and economically, guaranteeing a strict control of the stoichiometry of the oxides, without any separation and washing operations of the solid phases obtained.

The elimination of these phases allows the total recovery of the transition metals present in the reagent mixture. Analytic controls for determining the final composition of the oxide are therefore no longer necessary and the production of water polluted with salts of transition metals is also avoided, this is a particularly important aspect from an industrial point of view considering the classification of these salts as carcinogenic or potentially carcinogenic.

A further object of the present invention therefore relates to a sol-gel process, called SG process, for the preparation of mixed oxides having formula (A): the process comprises the preparation of mixed oxides having formula (A2), containing the nitrogenated compound N, which can be partially calcined to give the corresponding compounds having formula (A2) wherein C is an organic residue deriving from the partial calcination of the nitrogenated compound, or transformed into the mixed oxides having formula (A1) by total calcination.

Said sol-gel process for the preparation of mixed oxides having formula (A), called SG, therefore comprises:
preparing a hydroalcohol solution/suspension containing at least one soluble or partially soluble source of at least one element X, at least one soluble or partially soluble source of at least one element Y, at least one soluble source, which can be hydrolyzed or dispersed, of at least one element Z and a nitrogenated compound N selected from:
a) an alkyl ammonium hydroxide having formula (I)

$$R^{I}R^{II}R^{III}R^{IV}NOH \quad (I)$$

wherein the groups $R^{I}$-$R^{IV}$, the same or different, are aliphatic groups containing from 1 to 7 carbon atoms,
b) an amine having formula (II)

$$R^{1}R^{2}R^{3}N \quad (II)$$

wherein $R^{1}$ is a linear, branched or cyclic alkyl, containing from 4 to 12 carbon atoms, and
$R^{2}$ and $R^{3}$, the same or different, are selected from H and a linear, branched or cyclic alkyl, containing from 4 to 12 carbon atoms, said alkyl being equal to, or different from, $R^{1}$;
wherein the molar ratio N/(X+Y) is higher than 0 and lower than, or equal to 1, and preferably higher than 0.1;
obtaining the formation of a gel,
maintaining the gel under stirring preferably at a temperature ranging from 25 to 70° C. and for a time ranging from 1 to 48 hours,
maintaining the gel under static conditions, preferably at room temperature and for a period ranging from 24 to 100 hours,
drying the gel prepared in the previous step, obtaining the mixed oxide precursor having the molar formula (A2)

$$X_{a}Y_{b}Z_{c}O_{d} \cdot pC \quad (A2)$$

wherein X is selected from Ni, Co and mixtures thereof,
Y is selected from Mo, W and mixtures thereof,
Z is selected from Si, Al and mixtures thereof,
O is oxygen,
C is a nitrogenated compound N selected from the nitrogenated compounds mentioned above, having formula (I) or (II),
a, b, c, d are the number of moles of the elements X, Y, Z and O, respectively,
p is the weight percentage of C with respect to the total weight of the compound having formula (A2)
a, b, c, d are higher than 0
a/b is higher than or equal to 0.3 and lower than or equal to 2,
(a+b)/c is higher than or equal to 0.3 and lower than or equal to 10 and preferably ranges from 0.8 to 10, $$d=(2a+6b+Hc)/2$$

wherein
H=4 when Z=Si
H=3 when Z=Al
and p is higher than 0 and lower than or equal to 40%,
possibly subjecting the compound of formula (A2) resulting from the previous step, to partial or total calcination, respectively obtaining a compound having the same formula (A2) wherein C is an organic residue deriving from the calcination of the nitrogenated compound, or a mixed oxide of formula (A1)

$$X_{a}Y_{b}Z_{c}O_{d} \quad (A1)$$

wherein X, Y, Z, O, a, b, c, d correspond to those of the previous formula (A2).

Once the hydroalcohol solution/suspension has been prepared, the formation of the gel is spontaneous and can be either instantaneous or require up to 60 minutes of time, preferably under stirring.

Suitable sources of the metal Y are, for example, the corresponding acids, oxides and salts of ammonium. Ammonium heptamolybdate is preferably used as molybdenum salt and ammonium metatungstate as tungsten salt.

Suitable sources of the metal X are, for example, the corresponding nitrates, acetates, hydroxy carbonates, carbonates, acetylacetonates. Nitrates or acetates of Ni or Co are preferably used.

When, in particular, a mixed oxide containing at least one element selected from Ni and Co and a mixture of Mo and W, is desired, sources of both metals Mo and W will be present, whereas there will be the source of only one metal X; when a mixed oxide containing a mixture of Co and Ni and a mixture of Mo and W is prepared, sources of both metals Mo and W will be present and sources of both metals Co and Ni.

When X is a mixture of Ni and Co, the Ni/Co molar ratio in the reaction mixture preferably ranges from 100/1 to 1/100.

When Y is a mixture of Mo and W, the Mo/W molar ratio in the reaction mixture preferably ranges from 100/1 to 1/100.

When Z is silicon, colloidal silicas, fumed silica and tetra-alkyl orthosilicates in which the alkyl group contains from 1 to 4 carbon atoms, can be suitably used as corresponding soluble, dispersible or hydrolyzable compounds.

Hydrolyzable silicas, which, starting from monomeric precursors of silicon, guarantee a better dispersion in the gel, are preferably used. Tetraethyl orthosilicate is more preferably used.

When Z is aluminium, aluminium lactate can be suitably used as soluble compounds and, as corresponding dispersible or hydrolyzable compounds, dispersible aluminas, monohydrated aluminas AlOOH, trihydrated aluminnas Al(OH)$_3$, aluminium oxide, aluminium trialkoxides wherein the alkyl is linear or branched and can contain from 2 to 5 carbon atoms.

The dispersible aluminas are preferably bohemites or pseudo-bohemites characterized by particles with an average diameter of less than 100 microns. Dispersible aluminas which can be suitably used are for example bohemites of the series Versal®, Pural®, Catapal®, Disperal® and Dispal®.

Particularly preferred among dispersible aluminas are aluminas dispersible at room temperature in the presence of stirring in water or in aqueous solution containing a monovalent acid: in the dispersed phase these aluminas are nanodimensional, characterized by dimensions of the dispersed particles ranging from 10 to 500 nm. Dispersible aluminas of this type which can be suitably used are, for example, bohemites of the series Disperal® and Dispal®.

Hydrolyzable aluminas, which, starting from monomeric precursors of aluminium, guarantee a good dispersion in the gel, are preferably trialkyl aluminates in which the alkyl group contains from 3 to 4 carbon atoms.

In the drying step, the gel is dried, preferably at a temperature ranging from 80 to 120° C., with the formation of a compound having formula (A2) wherein C is the nitrogenated compound N.

According to what is specified above, the first five steps of the process allow to prepare compounds having formula (A2), wherein C is the nitrogenated compound N, which can be used as such, or, after shaping, directly for preparing the sulfided catalysts of the present invention, or they can be subjected to the subsequent step of at least partial calcination.

In the last step, a total calcination, i.e. such as to completely remove the nitrogenated compound, effected at a temperature of at least 450° C., preferably higher than or equal to 450° C. and lower than or equal to 600° C., in air or inert atmosphere, allows the mixed oxides having formula (A1) to be obtained:

$$X_a Y_b Z_c O_d \qquad (A1)$$

wherein X is selected from Ni, Co and mixtures thereof,
Y is selected from Mo, W and mixtures thereof,
Z is selected from Si, Al and mixtures thereof,
O is oxygen
a, b, c and d are the number of moles of the elements X, Y, Z, O, respectively
a, b, c, d are higher than 0
a/b is higher than or equal to 0.3 and lower than or equal to 2,
(a+b)/c is higher than or equal to 0.3 and lower than or equal to 10, and preferably varies from 0.8 to 10, $$d=(2a+6b+Hc)/2$$

wherein
H=4 when Z=Si
H=3 when Z=Al

Said mixed oxides, after possible shaping without a binder, or after shaping with a binder, can be sulfided to give in turn the catalysts of the present invention.

The calcination of the compound having formula (A2) can also be effected partially, at a temperature lower than 450° C. in air or in an inert atmosphere, preferably at a temperature lower than or equal to 400° C., even more preferably at a temperature ranging from 200 to 400° C.; the resulting product, containing an organic residue deriving from the calcination of the nitrogenated compound, is again of the type (A2), and can therefore be used in turn, after possible shaping without a binder or in the presence of a binder, for preparing the sulfided catalysts of the present invention, by sulfidation.

The gel obtained from the fourth step of the preparation process described above, also called aging step, which has not undergone drying, can also be used for preparing the sulfided catalysts of the present invention. In this case said gel must be subjected to shaping process before to be sulfided; the water contained therein will therefore be removed, thus causing, together with the shaping, a kind of drying, consequently generating, by means of an alternative synthesis, shaped compounds of the type (A2), wherein C is the nitrogenated compound N.

The particular preparation of the mixed oxides of the present invention having formula (A), (A1) and (A2) does not involve washing and filtration phases, and therefore guarantees the homogeneity of the composition and maintenance of the starting stoichiometry.

Furthermore, this particular preparation allows mixed oxides having formula (A1) having a high porosity and high surface area, to be obtained.

According to the general method described above, a particular object of the present invention relates to a sol-gel process, called SG-I, for the preparation of mixed oxides having formula (A) which comprises the following phases:
1) an aqueous solution (a) is prepared of at least one soluble or partially soluble source of at least one metal Y, and alkyl ammonium hydroxide, having the formula $$R^I R^{II} R^{III} R^{IV} NOH \qquad (I)$$

wherein the groups $R^I$-$R^{IV}$, the same or different, are aliphatic groups containing from 1 to 7 carbon atoms, is added to this solution,
2) a solution/suspension (b) in alcohol is prepared, preferably ethyl alcohol, of a hydrolyzable or dispersible soluble compound of the element Z and of at least a soluble or partially soluble source of at least one metal X;
3) the solution (a) and the solution/suspension (b) are mixed, obtaining the formation of a gel;
4) the gel is maintained under stirring, preferably at a temperature ranging from 25 to 70° C. and for a time ranging from 1 to 48 hours,
5) the gel is maintained under static conditions, preferably at room temperature for a period ranging from 24 to 100 hours,
6) the gel resulting from step (5) is dried, obtaining a mixed oxide having the molar formula (A2)

$$X_a Y_b Z_c O_d \cdot pC \qquad (A2)$$

wherein X is selected from Ni, Co and mixtures thereof,
Y is selected from Mo, W and mixtures thereof,
Z is selected from Si, Al and mixtures thereof,
O is oxygen,
C is a nitrogenated compound having formula (I),
a, b, c and d are the number of moles of the elements X, Y, Z and O, respectively,
p is the weight percentage of C with respect to the total weight of the compound of formula (A2)
a, b, c, d are higher than 0
a/b is higher than or equal to 0.3 and lower than or equal to 2,
(a+b)/c is higher than or equal to 0.3 and lower than or equal to 10, and preferably ranges from 0.8 to 10

$$d=(2a+6b+Hc)/2$$

wherein
H=4 when Z=Si
H=3 when Z=Al
p is higher than 0 and lower than or equal to 40%,
7) the product obtained from step (6) is possibly subjected to partial or total calcination, obtaining, respectively, a compound having the same molar formula (A2) wherein C is an organic residue deriving from the calcination of the nitrogenated compound, or a mixed oxide having formula (A1):

$$X_a Y_b Z_c O_d \qquad (A1)$$

wherein X is selected from Ni, Co and mixtures thereof,
Y is selected from Mo, W and mixtures thereof,
Z is selected from Si, Al and mixtures thereof,
O is oxygen
a, b, c, d are the number of moles of the elements X, Y, Z, O, respectively and are higher than 0
a/b is higher than or equal to 0.3 and lower than or equal to 2,
(a+b)/c is higher than or equal to 0.3 and lower than or equal to 10 and preferably ranges from 0.8 to 10

$$d=(2a+6b+Hc)/2$$

wherein
H=4 when Z=Si
H=3 when Z=Al.

All the aspects, conditions and reagents described for the general SG synthesis, are valid for this particular synthesis. In phase (1) alkylammonium hydroxides which can be suitably used are preferably tetra-alkylammonium hydroxides, wherein the alkyl groups, the same as each other, contain from 1 to 7 carbon atoms, and trimethylalkylammonium hydroxides, wherein the alkyl group contains from 1 to 7 carbon atoms. Tetrapropylamonium hydroxide is preferably used.

In step (3) the ratios between the reagents, expressed as molar ratios of the elements, are the following:

$$X/Y=0.3-2$$

$$R^I R^{II} R^{III} R^{IV} NOH/(X+Y)=0.1-0.6$$

(X+Y)/Z is higher than or equal to 0.3 and lower than or equal to 10

$$H_2O/(X+Y+Z)>10$$

$$Alcohol/H_2O=0-1$$

Even more preferably, the following molar ratios between the elements in step (3) are used:

$$X/Y=0.3-2$$

$$R^IR^{II}R^{III}R^{IV}NOH/(X+Y)=0.1-0.4$$

(X+Y)/Z is higher than or equal to 0.8 and lower than or equal to 10
$H_2O/(X+Y+Z)>10$, more preferably ranges from 15-53 Alcohol/$H_2O$=0.1-0.6, more preferably 0.25-0.4.

Step (3) is effected by adding one solution to the other; the mixing order does not jeopardize the preparation procedure.

In step (3), preferably carried out under stirring, the hydrolysis and polycondensation of the element Z source take place with the formation of a gel. The formation of the gel can be instantaneous or require up to 60 minutes of time. The gel maintained under stirring in step (4) is then kept under static conditions in step (5), called aging step. In step (6), the gel is then dried, preferably at a temperature ranging from 80 to 120° C., with the formation of a compound having formula (A2) which, in step 7, is at least partially calcined. The total or partial calcination is effected as previously described for the general SG synthesis.

According to another preferred aspect of the present invention, the amine having formula (II) is used in the preparation of the mixed oxides of the present invention. This preparation, in the case of mixed oxides comprising silicon, is indicated as SG-II-Si and comprises the following phases:

a) a solution (C) is prepared in alcohol, preferably ethyl alcohol, of a hydrolyzable or dispersible compound of silicon, and an amine having formula (II) is also added to this solution $$R^1R^2R^3N \quad (II)$$

wherein
R$^1$ is a linear, branched or cyclic alkyl, containing from 4 to 12 carbon atoms, and
R$^2$ and R$^3$, the same or different, are selected from H and a linear, branched or cyclic alkyl containing from 4 to 12 carbon atoms, said alkyl being the same or different from R$^1$;

b) a solution/aqueous suspension (D) is prepared of at least one source of at least one metal X and of at least one source of at least one metal Y;

c) the solution (C) and the solution/suspension (D) are mixed until a gel is formed;

d) the gel is maintained under stirring, preferably at a temperature ranging from 25 to 70° C., for a time ranging from 1 to 48 hours, e) the gel is maintained under static conditions, preferably at room temperature for a period ranging from 24 to 100 hours, f) the gel resulting from step (e) is dried, obtaining a mixed oxide precursor having the molar formula (A2)

$$X_aY_bZ_cO_d \cdot pC \quad (A2)$$

wherein X is selected from Ni, Co and mixtures thereof,
Y is selected from Mo, W and mixtures thereof,
Z is Si,
O is oxygen,
C is a nitrogenated compound having formula (II),
a, b, c, d are the number of moles of the elements X, Y, Z and O, respectively,
p is the weight percentage of C with respect to the total weight of the compound of formula (A2)
a, b, c and d are higher than 0
a/b is higher than or equal to 0.3 and lower than or equal to 2,
(a+b)/c is higher than or equal to 0.3 and lower than or equal to 10 and preferably varies from 0.8 to 10, $$d=(2a+6b+Hc)/2$$

wherein H=4
p is higher than 0 and lower than or equal to 40%, g) the product obtained in the previous step is possibly subjected to partial or total calcination, obtaining, respectively, a mixed oxide having the same molar formula (A2) wherein C is an organic residue deriving from the partial calcination of the nitrogenated compound N, or a mixed oxide having the molar formula (A1):

$$X_aY_bZ_cO_d \quad (A1)$$

wherein X is selected from Ni, Co and mixtures thereof,
Y is selected from Mo, W and mixtures thereof,
Z is Si
O is oxygen
a, b, c and d are the number of moles of the elements X, Y, Z, O, respectively
a, b, c, d are higher than 0
a/b is higher than or equal to 0.3 and lower than (a+b)/c is higher than or equal to 0.3 and lower than or equal to 10, and preferably ranges from 0.8 to 10, $$d=(2a+6b+Hc)/2$$

wherein H=4.

All the aspects, conditions and reagents described for the general SG synthesis, are valid for this particular synthesis.

The amine is preferably selected from n-hexylamine, n-heptylamine and n-octylamine.

In the mixing and stirring phase (c), the ratios between the reagents, expressed as molar ratios, are the following:

$$X/Y=0.3-2$$

$$R^1R^2R^3N/(X+Y)=0.1-1, \text{ more preferably } 0.15-0.7$$

(X+Y)/Si is higher than or equal to 0.3 and lower than or equal to 10 and preferably ranges from 0.8 to 10, $H_2O/(X+Y+Si)$ ≥10, and more preferably ranges from 15-30
Alcohol/$H_2O$=0-0.4, more preferably 0.2-0.4.

In step (c), the hydrolysis and polycondensation of the silicon source take place with the formation of a gel. The formation of the gel can be instantaneous or require up to 60 minutes of time. The gel maintained under stirring in step (d) is then aged i.e. kept under static conditions, in step (e). In step (f), the gel is then dried, preferably at a temperature ranging from 80 to 120° C., with the formation of a compound having formula (A2). This compound is subjected to at least partial calcination in the subsequent step (g). The total or partial calcination is effected as previously described for the general SG synthesis.

In the case of mixed oxides containing aluminium as component Z, the synthesis procedure, indicated as SG-II-Al, which uses an amine becomes the following:

a) a solution (C) is prepared in alcohol, preferably ethyl alcohol, of an amine having formula (II)

$$R^1R^2R^3N \quad (II)$$

wherein
R$^1$ is a linear, branched or cyclic alkyl, containing from 4 to 12 carbon atoms, and R² and R³, the same or different, are selected from H and a linear, branched or cyclic alkyl containing from 4 to 12 carbon atoms, said alkyl being the same or different from R¹;

b) a solution/aqueous suspension (D) is prepared of soluble or partially soluble sources of at least one metal X, at least one metal Y and a hydrolyzable compound of aluminium;

c) the solution (C) and the solution/suspension (D) are mixed until a gel is formed;

d) the gel is maintained under stirring, preferably at a temperature ranging from 25 to 70° C., for a time ranging from 1 to 48 hours, e) the gel is maintained under static conditions, preferably at room temperature for a period of 24 to 100 hours, f) the gel resulting from step (e) is dried, obtaining a precursor mixed oxide having the molar formula (A2)

$$X_a Y_b Z_c O_d \cdot pC \quad (A2)$$

wherein X is selected from Ni, Co and mixtures thereof,
Y is selected from Mo, W and mixtures thereof,
Z is Al,
O is oxygen,
C is a nitrogenated compound having formula (II),
a, b, c and d are the number of moles of the elements X, Y, Z and O, respectively,
p is the weight percentage of C with respect to the total weight of the compound of formula (A2)
a, b, c, d are higher than 0
a/b is higher than or equal to 0.3 and lower than or equal to 2,
(a+b)/c is higher than or equal to 0.3 and lower than or equal to 10, and preferably varies from 0.8 to 10, $$d=(2a+6b+Hc)/2$$

wherein H=3
p is higher than 0 and lower than or equal to 40%, g) the product obtained in the previous step is possibly subjected to partial or total calcination, obtaining, respectively, a mixed oxide having the same molar formula (A2) wherein C is an organic residue deriving from the partial calcination of the nitrogenated compound, or a mixed oxide having the formula (A1):

$$X_a Y_b Z_c O_d \quad (A1)$$

wherein X is selected from Ni, Co and mixtures thereof,
Y is selected from Mo, W and mixtures thereof,
Z is Al
O is oxygen
a, b, c, d are the number of moles of the elements X, Y, Z, O, respectively
a, b, c, d are higher than 0
a/b is higher than or equal to 0.3 and lower than or equal to 2,
(a+b)/c is higher than or equal to 0.3 and lower than or equal to 10, and preferably varies from 0.8 to 10, $$d=(2a+6b+Hc)/2$$

wherein H=3.

All the aspects, conditions and reagents described for the general SG synthesis, are valid for this particular synthesis.

In phase (a), the amine is preferably selected from n-hexylamine, n-heptylamine and n-octylamine.

In phase (c), the ratios between the reagents, expressed as molar ratios, are the following:

$$X/Y = 0.3 - 2$$

$$R^1R^2R^3N/(X+Y) = 0.1 - 1 \text{ and preferably } 0.15 - 0.6$$

(X+Y)/Al is higher than or equal to 0.3 and lower than or equal to 10 and preferably varies from 0.8 to 10
$H_2O/(X+Y+Al) \geq 10$ and preferably ranges from 10 to 30
Alcohol/$H_2O$=0-1 and preferably ranges from 0.2 to 0.7.

Step (c) is effected by adding one solution to the other; the mixing order does not jeopardize the preparation procedure.

In step (c), the hydrolysis and polycondensation of the aluminium source take place with the formation of a gel. The formation of the gel can be instantaneous or require up to 60 minutes of time. The gel maintained under stirring in step (d) is then aged, i.e. maintained under static conditions in step (e).

In step (f), the gel is then dried, preferably at a temperature ranging from 80 to 120° C., and at least partially calcined in air or in an inert atmosphere. The total or partial calcination is effected as previously described for the general SG synthesis.

Before the sulfidation phase, the mixed oxide precursor may require a shaping process phase, depending on the type of reactor in which it is used. Normally, the most widely used shaping techniques without the addition of a binder are pressing, binder-free extrusion, pelletization and agglomeration in spheroidal form by means of spray-drying and drop coagulation techniques. For this type of application, the most convenient technique is extrusion, either with or without a binder. This technique requires the possible addition to the material to be shaped, before extrusion and to allow the extrusion process of the material, of a mineral or organic acid and/or a plasticizing agent and/or a porogen agent and/or an oxide which acts as binder. These techniques are known to experts in the field and are described for example in "Extrusion in Ceramics", Händle, Frank (Eds.), Springer 2007.

With all these known techniques, it is possible to subject both materials of type (A1) and materials of type (A2) to shaping process, still containing the nitrogenated compound N used in the synthesis, or an organic residue deriving therefrom by partial calcination.

An object of the present invention also relates to particular shaping processes for preparing shaped compounds having formula A.

In particular, an object of the present invention therefore relates to a sol-gel process, for preparing compounds having formula (A), shaped, and possibly also shaped with a binder, called SG-Form-1 process, comprising:

I) preparing a hydroalcohol solution/suspension containing at least one soluble or partially soluble source of at least one element X, at least one soluble or partially soluble source of at least one element Y, at least one soluble, hydrolyzable or dispersible source of at least one element Z and a nitrogenated compound N selected from:

a) an alkyl ammonium hydroxide having formula (I)

$$R^I R^{II} R^{III} R^{IV} NOH \quad (I)$$

wherein the groups $R^I$-$R^{IV}$, the same or different, are aliphatic groups containing from 1 to 7 carbon atoms, b) an amine having formula (II)

$$R^1 R^2 R^3 N \quad (II)$$

wherein R¹ is a linear, branched or cyclic alkyl, containing from 4 to 12 carbon atoms, and
R² and R³, the same or different, are selected from H and a linear, branched or cyclic alkyl, containing from 4 to 12 carbon atoms, said alkyl being equal to, or different from, R¹;

II) obtaining the formation of a gel,

III) maintaining the gel under stirring, preferably at a temperature ranging from 25 to 80° C., possibly after the addition of a soluble, hydrolyzable or dispersible source of an oxide MeO, in a weight ratio with the gel ranging from 5 to 50% by weight with respect to the theoretical weight of the oxides contained in the gel, and possibly after the addition of a mineral or organic acid in a quantity ranging from 0.5 to 8.0 g per 100 g of source of the oxide MeO, for a time sufficient for obtaining a homogeneous paste having a consistency which is normally considered suitable for extrusion, IV) extruding the product obtained from the previous step,
V) drying the extruded product obtained, preferably at a temperature ranging from 40 to 120° C.,
VI) at least partially calcining the extruded product obtained in the previous step, in an oxidizing or inert atmosphere.

A preferred aspect is that steps I and II are effected as described for the sol-gel process SG-I, steps 1-3, and for the processes SG-II-Al and SG-II-Si, steps a-c. In particular, all the aspects relating to conditions, compositions and reagents described for these steps can be used for steps I and II of the sol-gel synthesis SG-Form-1 described above for preparing shaped compounds having formula (A), and possibly also shaped with a binder.

In step III, the addition of a soluble, dispersible or hydrolyzable source of oxide MeO is optional and is always effected when the gel deriving from the previous step has a content of element Z lower than 5% with respect to the total weight of the oxides contained in the gel. Total weight of the oxides contained in the gel refers to the sum of the oxides present in the reagent mixture, calculated considering that all the compounds X, Y, Z are transformed into the corresponding oxides.

The oxide MeO, when present, acts as binder, and a preferred aspect is for said oxide MeO to be silicon oxide or aluminium oxide, and even more preferably an oxide of the same element Z present in the gel. When Me is aluminium or silicon, hydrolyzable or dispersible sources of oxide MeO which can be suitably used in this shaping process are the same used for the element Z in the preparation phase of the gel. When Me is silicon, for example, colloidal silicas, fumed silica and tetra-alkyl orthosilicates in which the alkyl group contains from 1 to 4 carbon atoms, can be suitably used as corresponding dispersible or hydrolyzable compounds. When Me is aluminium, monohydrated aluminas AlOOH, trihydrated aluminas Al(OH)$_3$, aluminium oxide, dispersible aluminas, aluminium trialkoxides wherein the alkyl is linear or branched and can contain from 2 to 5 carbon atoms, can be suitably used.

The dispersible aluminas are preferably bohemites or pseudo-bohemites characterized by particles with an average diameter of less than 100 microns. Dispersible aluminas which can be suitably used are for example bohemites of the series Versal®, Pural®, Catapal®, Disperal® and Dispal®.

Particularly preferred among dispersible aluminas are aluminas dispersible at room temperature in the presence of stirring in water or in aqueous solution containing a monovalent acid: in the dispersed phase these aluminas are nanodimensional, characterized by dimensions of the dispersed particles ranging from 10 to 500 nm. Dispersible aluminas of this type which can be suitably used are in particular bohemites of the series Disperal® and Dispal®.

In step III, mineral or organic acids, when used, can be:
acids already contained in the dispersible or hydrolyzable source of oxide MeO which is added to the gel, such as for example acetic acid, nitric acid,
acids contained in the gel deriving from step II if said gel has been prepared using in step I, a dispersible or hydrolyzable source of element Z which contains acids,
acids added directly in step III, if one of the previous two hypotheses is not verified, for example acetic acid, nitric acid, phosphoric acid or boric acid.

In step III, plasticizing agents, such as methyl cellulose, stearin, glycerine and porogen agents, such as for example soluble starch, can also be added.

The calcination step VI is effected at a temperature lower than 450° C., preferably lower than or equal to 400° C., if an extruded product containing a mixed oxide having formula (A2) is to be obtained, and at a temperature equal to or higher than 450° C., preferably higher than or equal to 450° C. and lower than or equal to 600° C., if an extruded product containing a mixed oxide having formula (A1) is to be obtained.

An aspect of this particular procedure, when a hydrolyzable or dispersible source of an oxide MeO is not added, consists in the absence of any binder which can alter the composition and physico-chemical properties of the oxide precursor, and consequently of the final catalyst.

If, when using the procedure described above, a suitable source of oxide MeO is added, at the end of the shaping process a composition containing a mixed oxide in shaped form with a binder is obtained. Said composition contains:
the binder MeO, in a quantity preferably higher than 5% and lower than or equal to 50% by weight with respect to the weight of the mixed oxide, even more preferably from 5 to 30% by weight with respect to the weight of the mixed oxide, and wherein said oxide MeO is preferably aluminium oxide or silicon oxide, and even more preferably is an oxide corresponding to the element Z contained in the gel,
a mixed oxide (A) essentially having the same characteristics of porosity, surface area and structure as the corresponding mixed oxide without a binder.

Another particular object of the present invention relates to a sol-gel process for preparing shaped compounds having formula (A), called SG-Form-2, comprising:
I) preparing a hydroalcohol solution/suspension containing at least one soluble or partially soluble source of at least one element X, at least one soluble or partially soluble source of at least one element Y, at least one soluble, hydrolyzable or dispersible source of at least one element Z and a nitrogenated compound N selected from:
a) an alkyl ammonium hydroxide having formula (I)

$$R^I R^{II} R^{III} R^{IV} NOH \quad (I)$$

wherein the groups $R^I$-$R^{IV}$, the same or different, are aliphatic groups containing from 1 to 7 carbon atoms,
b) an amine having formula (II)

$$R^1 R^2 R^3 N \quad (II)$$

wherein $R^1$ is a linear, branched or cyclic alkyl, containing from 4 to 12 carbon atoms, and
$R^2$ and $R^3$, the same or different, are selected from H and a linear, branched or cyclic alkyl, containing from 4 to 12 carbon atoms, said alkyl being equal to, or different from, $R^1$;

II) obtaining the formation of a gel,
III) maintaining the gel at a temperature ranging from 25 to 80° C., for a time ranging from 1 to 48 hours,
IV) drying an aliquot of the gel obtained in step III, subjecting it to at least partial calcination, and adding it, possibly after blandly disaggregating it, to the remaining gel as such, in a weight ratio, between at least partially calcined product and gel as such greater than or equal to 1,
V) extruding the product thus obtained,
VI) possibly drying the extruded product obtained, preferably at a temperature ranging from 40 to 120° C. and, VII) at least partially calcining the extruded product thus obtained, in an oxidizing or inert atmosphere.

A preferred aspect is for steps I and II to be effected as described for the sol-gel process SG-I, steps 1-3, and for the processes SG-II-Al and SG-II-Si, steps a-c. In particular, all the aspects relating to conditions, compositions and reagents described for these steps can be used for steps I and II of the sol-gel synthesis SG-Form-2 described above for preparing shaped compounds having formula (A).

Step III is preferably carried out in an open system and, depending on the temperature and time selected, can therefore lead to a concentration of the gel, by evaporation of the mixture of solvents.

In step IV the aliquot of gel is dried, preferably at a temperature ranging from 80 to 120° C., and calcined in air, or in an inert atmosphere. In step IV the calcinations can be effected at a temperature lower than 450° C., preferably lower than or equal to 400° C., if a material containing a mixed oxide having formula (A2) is to be obtained, and at a temperature equal to or higher than 450° C., preferably higher than or equal to 450° C. and lower than or equal to 600° C., if a material containing a mixed oxide having formula (A1) is to be obtained.

In step V, plasticizing agents, such as methyl cellulose, stearin, glycerine and porogen agents, such as for example soluble starch, can also be added.

Analogously to step IV, in step VII the calcinations can be effected at a temperature lower than 450° C., preferably lower than or equal to 400° C., if an extruded product containing a mixed oxide having formula (A2) is to be obtained, and at a temperature equal to or higher than 450° C., preferably higher than or equal to 450° C. and lower than or equal to 600° C., if an extruded product containing a mixed oxide having formula (A1) is to be obtained.

The mechanical characteristics of the extruded product thus obtained are suitable for sustaining both the sulfidation phase and thermo-mechanical stress during its use.

The fundamental aspect of this particular procedure consists in the absence of any binder which can alter the composition and physico-chemical properties of the precursor oxide, and consequently of the final catalyst.

The catalysts of the present invention obtained by sulfidation of the mixed oxides having formula (A), possibly shaped without a binder, or of mixed oxides having formula (A) in the form shaped with a binder, are extremely active catalysts and stable in hydrotreatment processes and can be suitably used in all refining processes in which hydrotreatment operations must be effected, and in particular for obtaining the desulfurization and denitrogenation of a hydrocarbon mixture.

A further object of the present invention therefore relates to a process for the hydrotreatment of a feedstock containing one or more hydrocarbons which comprises putting said feedstock in contact with the catalysts of the present invention obtained by sulfidation of the mixed oxides having formula (A), possibly shaped.

Any feedstock or hydrocarbon mixture containing sulfur or nitrogen impurities can be treated with the catalysts of the present invention: oil distillates, oil residues, naphtha, light cycle oil, atmospheric gas oil, heavy gas oil, lube oil, for example, can be subjected to treatment.

With the catalysts of the present invention, it is possible to treat hydrocarbon cuts containing up to 30,000 ppm of sulfur and possibly up to 2,000 ppm of nitrogen.

It is preferable to operate at a temperature ranging from 100 to 450° C., preferably from 300 to 370° C., and a pressure ranging from 50 to 100 bar, preferably from 50 to 70 bar. The WHSV ranges from 0.5 to 10 hours$^{-1}$, preferably from 1 to 2 hours$^{-1}$. The quantity of hydrogen can vary from 100 to 800 times the quantity of hydrocarbons, expressed as $NlH_2/l$ of hydrocarbon mixture.

The synthesis and sol-gel processes of the precursor oxides of the catalysts and catalytic tests are described in the following examples but should in no way be considered as limiting the scope of the invention itself.

EXAMPLE 1

Comparative 6.62 g of octylamine are dissolved in 40 g of absolute ethanol. A solution consisting of 14.89 g of nickel nitrate hexahydrate (NiNO), 4.52 g of ammonium heptamolybdate (EMA) and 6.98 g of ammonium metatungstate hydrate (MTA) in 50 ml of $H_2O$ is then added under stirring to solution A. The octylamine/(Ni+Mo+W) molar ratio is equal to 0.5.

A light green-coloured relatively fluid gel is formed which is left under stirring for 3 hours, gently heating to 70° C. It is left to rest for 72 hours. The gel obtained does not have a supernatant and is left to dry in an oven at 100° C. for 48 hours.

The dried material is calcined in air at 400° C. for hours. The solid obtained has a molar composition $Ni_{0.05}Mo_{0.03}W_{0.03}O_{0.23}$ and contains 1.5% by weight of organic residue with respect to the total weight. The specific surface area is 65 m$^2$/g, the total pore volume 0.228 cm$^3$/g, the average pore diameter 7.5 nm, calculated from the desorption isotherm.

EXAMPLE 2

9.04 g of ammonium heptamolybdate (EMA) are dissolved in 100 ml of an aqueous solution of tetrapropyl ammonium hydroxide TPAOH at 5% (solution a). A solution consisting of 14.89 g of nickel nitrate hexhydrate (NiNO) and 4.31 g of tetraethyl orthosilicate TEOS in 80 g of absolute ethanol (solution b) is added under stirring to solution (a). The TPAOH/(Ni+Mo) molar ratio is equal to 0.25. A uniform light green-coloured fluid gel is immediately formed which is left under intensive stirring for 4 hours at 70° C. After resting for 48 hours, the viscous gel is dried at 100° C. for 48 hours and calcined in air at 400° C. for 5 hours. The solid obtained, subjected to chemical analysis, has the following composition (weight percentage): NiO=30.7%, $MoO_3$=58.8%, $SiO_2$=10.5%.

The material obtained has a molar composition $Ni_{0.05}Mo_{0.05}Si_{0.02}O_{0.23}$ and contains 0.1% by weight of organic residue with respect to the total weight. The specific surface area is 135 m$^2$/g, the total pore volume 0.32 cm$^3$/g, the average pore diameter 9.3 nm, calculated from the desorption isotherm.

EXAMPLE 3

7.96 g of octylamine and 4.33 g of tetraethyl orthosilicate TEOS are dissolved in 40 g of absolute ethanol (solution C). A solution consisting of 14.89 g of nickel nitrate hexahydrate (NiNO) and 9.04 g of ammonium heptamolybdate (EMA) in 50 ml of $H_2O$ (solution D) is then added under stirring to solution C. The octylamine/(Ni+Mo+W) molar ratio is equal to 0.6. A light green-coloured relatively fluid gel is formed which is left under stirring for 3 hours, gently heating to 70° C. It is left to rest for 72 hours. The gel obtained does not have a supernatant and is left to dry in an oven at 100° C. for 48 hours. The dried material is calcined in air at 400° C. for 5 hours. The solid obtained, subjected to chemical analysis, has the following composition (weight percentage): NiO=30.7%, MoO3=59.3%, SiO2=10%.

The solid obtained has the following molar composition $Ni_{0.05}Mo_{0.05}Si_{0.02}O_{0.23}$ and contains 1.8% by weight of organic residue with respect to the total weight. The specific surface area is 123 m$^2$/g, the total pore volume 0.443 cm$^3$/g, the average pore diameter 15.9 nm, calculated from the desorption isotherm.

EXAMPLE 4

4.52 g of ammonium heptamolybdate (EMA) and 6.98 g of ammonium metatungstate hydrate (MTA) are dissolved in 100 ml of an aqueous solution of tetrapropyl ammonium hydroxide TPAOH at 5.2% (solution a). A solution consisting of 14.89 g of nickel nitrate hexahydrate (NiNO) and 5.2 g of TEOS in 80 g of absolute ethanol (solution b) is added under stirring to solution (a). The TPAOH/(Ni+Mo+W) molar ratio is equal to 0.24. A uniform light green-coloured fluid gel is immediately formed which is left under intensive stirring for 4 hours. After resting for 48 hours, the viscous gel is dried at 120° C. for 48 hours.

A quota of material is calcined in air at 400° C. for 5 hours.

The solid obtained, subjected to chemical analysis, has the following composition (weight percentage): NiO=25.2%, MoO$_3$=23.8%, WO$_3$=40%, SiO$_2$=11%.

The solid obtained has the following molar composition $Ni_{0.05}Mo_{0.03}W_{0.03}Si_{0.02}O_{0.27}$ and contains 0.08% by weight of organic residue with respect to the total weight. The specific surface area is 143 m$^2$/g, the total pore volume 0.404 cm$^3$/g, the average pore diameter 9.2 nm, calculated from the desorption isotherm.

Another quota of material is calcined in air at 550° C. for 5 hours. The solid obtained has maintained the molar formula $Ni_{0.05}Mo_{0.03}W_{0.03}Si_{0.02}O_{0.27}$, the specific surface area is 122 m$^2$/g, the total pore volume 0.339 cm$^3$/g, the average pore diameter 9.4 nm, calculated from the desorption isotherm.

EXAMPLE 5

8.22 g of octylamine and 5.2 g of tetraethyl orthosilicate TEOS are dissolved in 40 g of absolute ethanol (solution C). A solution consisting of 14.89 g of nickel nitrate hexahydrate (NiNO), 4.52 g of ammonium heptamolybdate (EMA) and 6.98 g of ammonium metatungstate hydrate (MTA) dissolved in 50 ml of H$_2$O (solution D) is then added under stirring to solution C. The octylamine/(Ni+Mo+W) molar ratio is equal to 0.6.

A light green-coloured gel is formed which is left under stirring for 3 hours, gently heating to 70° C. It is left to rest for 48 hours. The gel obtained does not have a supernatant and is left to dry in an oven at 100° C. for 48 hours.

A quota of material is calcined in air at 400° C. for 5 hours. The solid obtained has the following molar composition $Ni_{0.05}Mo_{0.03}W_{0.03}Si_{0.03}O_{0.29}$ and contains 1.9% by weight of organic residue with respect to the total weight. The specific surface area is 142 m$^2$/g, the total pore volume 0.294 cm$^3$/g, the average pore diameter 5.5 nm, calculated from the desorption isotherm.

Another quota of solid is calcined in air at 550° C. for 5 hours. The resulting solid has maintained the molar formula $Ni_{0.05}Mo_{0.03}W_{0.03}Si_{0.02}O_{0.27}$, the specific area surface is 86 m$^2$/g, the total pore volume 0.299 cm$^3$/g, the average pore diameter 11.7 nm, calculated from the desorption isotherm.

EXAMPLE 6

7.56 g of octylamine are dissolved in 40 g of absolute ethanol (solution C). A solution consisting of 14.89 g of nickel nitrate hexahydrate (NiNO), 4.52 g of ammonium heptamolybdate (EMA) and 6.98 g of ammonium metatungstate hydrate (MTA) dissolved in 50 ml of an aqueous sol containing 14.90 g of an aqueous dispersion of bohemite (Disperal® P2 of Sasol™) at 10% by weight (solution D) is then added under stirring to solution C. The octylamine/(Ni+Mo+W) molar ratio is equal to 0.6. A light green-coloured gel is formed which is left under stirring for 3 hours, heating to 70° C. It is left to rest for 48 hours. The gel obtained does not have a supernatant and is left to dry in an oven at 90° C. for 48 hours. The dried material is subjected to calcination treatments in air at different temperatures: 200, 300 and 400° C. for 5 hours.

The fraction of residual organic component on the sample depends on the thermal treatment to which it is subjected. The table indicates the weight percentage of organic residue, with respect to the total weight of the solid, in relation to the final temperature of the thermal calcination treatment.

| Temperature (° C.) | Weight % of organic residue with respect to the total weight of the solid* (% w/w) |
| --- | --- |
| 200 | 7.7 |
| 300 | 5.4 |
| 400 | 2.0 |

*the organic residue was calculated from the weight loss between 200-600° C., measured by TGA analysis, on the materials precalcined at the temperature indicated.

The solid obtained after calcination at 400° C. in air for 5 hours, called sample C, has the following molar composition $Ni_{0.05}Mo_{0.03}W_{0.03}Al_{0.03}O_{0.28}$ and contains 2.0% by weight of organic residue with respect to the total weight of the solid. The specific surface area is 151 m$^2$/g, the total pore volume 0.381 cm$^3$/g, the average pore diameter 6.3 nm, calculated from the desorption isotherm.

EXAMPLE 7

4.52 g of ammonium heptamolybdate (EMA) and 6.98 g of ammonium metatungstate hydrate (MTA) are dissolved in 100 ml of an aqueous solution of tetrapropyl ammonium hydroxide TPAOH at 5.2% (solution a). A solution consisting of 14.9 g of cobalt nitrate hexhydrate (CoNO) and 5.2 g of TEOS in 80 g of absolute ethanol (solution b) is added under stirring to solution (a). The TPAOH/(Ni+Mo+W) molar ratio is equal to 0.24.

A uniform purple-coloured fluid gel is immediately formed which is left under intensive stirring for 4 hours, heating to 70° C. It is left to rest for 3 days and is finally dried at 100° C. for 72 hours and calcined in air at 400° C. for 5 hours.

The solid obtained, subjected to chemical analysis, has the following composition (weight percentage): CoO=24.8%, MoO$_3$=23.8%, WO$_3$=41.4%, SiO$_2$=10%.

The solid obtained has the following molar composition $Co_{0.05}Mo_{0.03}W_{0.03}Si_{0.03}O_{0.29}$ and contains 0.1% by weight of organic residue with respect to the total weight.

The specific surface area is 115 m$^2$/g, the total pore volume 0.255 cm$^3$/g, the average pore diameter 9.1 nm, calculated from the desorption isotherm.

EXAMPLE 8

8.22 g of octylamine and 5.2 g of tetraethyl orthosilicate TEOS are dissolved in 40 g of absolute ethanol (solution C).

A solution consisting of 14.9 g of cobalt nitrate hexahydrate (CoNO), 4.52 g of ammonium heptamolybdate (EMA) and 6.98 g of ammonium metatungstate hydrate (MTA) dissolved in 50 ml of $H_2O$ (solution D) is then added under stirring to solution C. The octylamine/(Co+Mo+W) molar ratio is equal to 0.6.

A purple gel is formed which is left under stirring for 3 hours at 70° C. It is left to rest for 48 hours. The gel obtained is dried in an oven at 90-100° C. for 48 hours. The dried material is calcined in air at 400° C. for 5 hours.

The solid obtained, subjected to chemical analysis, has the following composition (weight percentage): CoO=24.7%, $MoO_3$=24.2%, $WO_3$=41.1%, $SiO_2$=10%.

The solid obtained has the following molar composition $Co_{0.05}Mo_{0.03}W_{0.03}Si_{0.03}O_{0.29}$ and contains 2.1% by weight of organic residue with respect to the total weight.

The specific surface area is 90 $m^2/g$, the total pore volume 0.182 $cm^3/g$, the average pore diameter 4.8 nm, calculated from the desorption isotherm.

EXAMPLE 9

7.56 g of octylamine are dissolved in 80 g of absolute ethanol (solution C). A solution consisting of 12.74 g of nickel acetate tetrahydrate (NiAc), 4.52 g of ammonium heptamolybdate (EMA) and 6.98 g of ammonium metatungstate hydrate (MTA) dissolved in 200 ml of an aqueous sol containing 14.9 g of an aqueous dispersion at 0.6% in acetic acid of bohemite (Disperal® P3 of Sasol™) at 10% by weight (solution D) is then added under stirring to solution C. The octylamine/(Ni+Mo+W) molar ratio is equal to 0.6.

A light green-coloured gel is formed which is left under stirring for 8 hours, heating to 70° C. It is left to rest for 48 hours. The gel is dried in an oven at 80° C. for 48 hours.

The dried material is subjected to calcination treatment in air at 400° C. for 5 hours.

The solid obtained has the following molar composition $Ni_{0.05}Mo_{0.03}W_{0.03}Al_{0.03}O_{0.28}$ and contains 2.2% by weight of organic residue with respect to the total weight. The specific surface area is 111 $m^2/g$, the total pore volume 0.19 $cm^3/g$, the average pore diameter 3.7 nm, calculated from the desorption isotherm.

EXAMPLE 10

8.98 g of Bohemite SASOL DISPERAL P2 (73% w/w $Al_2O_3$) are dispersed in 100 g of demineralized $H_2O$. 89.34 g of nickel nitrate hexahydrate (NiNO), 27.12 g of ammonium heptamolybdate (EMA) and 41.88 g of ammonium metatungstate hydrate (MTA) are added to the dispersion in order and the mixture is brought to a volume of about 300 ml with demineralized $H_2O$.

45.30 g of octylamine (99% w/w) are diluted in 240 g of absolute ethanol and subsequently added to the dispersion. The gel formed is heated, under stirring to 70° C. in an open beaker for 14 hours and is concentrated until a homogeneous gel is obtained, which is left to age for 40 hours. The octylamine/(Ni+Mo+W) molar ratio is equal to 0.6.

Half of the gel is dried and calcined at 400° C. The solid obtained has the following molar composition $Ni_{0.15}Mo_{0.08}W_{0.09}Al_{0.06}O_{0.75}$ and contains 2.1% by weight of organic residue with respect to the total weight. The remaining gel is introduced into a Brabender mixer.

60 g of Bohemite SASOL DISPERAL P2 and 30 ml of $H_2O$ are added, under mixing, at 50 rpm. The mixture is heated to 80° C. for about 3 hours until a homogeneous paste with a suitable consistency for being extruded, is obtained.

The mixture is cooled and the compound is discharged and extruded with a Hosokawa extruder of the Hutt type having a diameter of the holes of 1.5 mm. The extruded product is left to age at room temperature for a night, then dried in a static oven at 90° C. for 5 hours and calcined in a flow of air according to the following program:
from room temperature to 100° C. with a rise of 2° C./min, at 100° C. for 5 hours then at 120° C., 2° C./min, for 5 hours, at 130° C., 2° C./min, for 5 hours, at 160° C., 2° C./min, for 5 hours, at 200° C., 2° C./min, for 5 hours and at 400° C., 2° C./min, for 10 hours.

The final extruded product consists of 50% by weight of mixed oxide and 50% by weight of alumina binder.

The extruded product has a good mechanical resistance.

EXAMPLE 11

Comparative

An extruded product is prepared using a reaction mixture in which the octylamine/(Ni+Mo+W) molar ratio is equal to 1.5.

69.1 g of Bohemite SASOL DISPERAL P2 (73% w/w $Al_2O_3$) are dispersed in 300 g of demineralized $H_2O$.

53.5 g of nickel nitrate hexahydrate (NiNO), 16.2 g of ammonium heptamolybdate (EMA) and 25.1 g of ammonium metatungstate hydrate (MTA) are added to the dispersion in order and the mixture is brought to a volume of about 500 ml with demineralized $H_2O$.

75.60 g of octylamine (99% w/w) are diluted in 400 g of absolute ethanol and subsequently added to the dispersion. The octylamine/(Ni+Mo+W) molar ratio is equal to 1.6.

The gel formed is heated, under stirring to about 70° C. in an open beaker for 16 hours. It is left under static conditions for a night. The gel is introduced into a Brabender mixer and mixed at 50 rpm at 50° C. for 0.5 hours and at 80° C. for 3 hours until a paste is obtained, suitable for being extruded with a Hosokawa extruder of the Hutt type having a diameter of the holes of 1.5 mm. The extruded product is left to age at room temperature for a night, then dried in a static oven at 90° C. for 5 hours and calcined in a flow of air according to the following program:
from room temperature to 100° C. with a rise of 2° C./min, at 100° C. for 5 hours then at 120° C., 2° C./min, for 5 hours, at 130° C., 2° C./min, for 5 hours, at 160° C., 2° C./min, for 5 hours, at 200° C., 2° C./min, for 5 hours and at 400° C., 2° C./min, for 10 hours.

EXAMPLE 12

76.1 g of octylamine and 48.1 g of tetraethyl orthosilicate TEOS are dissolved in 370 g of absolute ethanol (solution C). A solution consisting of 137.9 g of nickel nitrate hexahydrate (NiNO), 41.9 g of ammonium heptamolybdate (EMA) and 64.6 g of ammonium metatungstate hydrate (MTA) dissolved in 460 ml of $H_2O$ (solution D) is then added under stirring to solution C. The octylamine/(Ni+Mo+W) molar ratio is equal to 0.6.

A light green-coloured gel is formed which is concentrated to 600 g by evaporation at 80° C. After 48 hours of resting, 80 g of the gel obtained are collected. A solid is obtained from the remaining quantity which can be easily pulverized, after drying at 100° C. for 48 hours and calcination in air at 400° C. for 5 hours.

The solid obtained has the following molar composition $Ni_{0.41}Mo_{0.21}W_{0.23}Si_{0.20}O_{2.13}$ and contains 2.2% by weight of organic residue with respect to the total weight.

120 g of this calcined powder are amalgamated with the 80 g of gel previously collected and the homogeneous paste thus obtained is drawn directly at room temperature in a Brabender extruder. Rigid formulates are obtained with a specifically regulated sizing of 5 mm in length and 1.5 mm in diameter. After calcination at 400° C. for 5 hours, a material with a good mechanical resistance is obtained.

The extruded product obtained has a surface area equal to 136 m²/g, a total pore volume of 0.26 cm³/g and an average pore diameter of 7.4 nm, calculated from the desorption isotherm.

EXAMPLE 13

54 g of Bohemite SASOL DISPERAL P2 (73% w/w $Al_2O_3$) are dispersed in 600 g of demineralized $H_2O$.

554 g of nickel nitrate hexahydrate (NiNO), 162 g of ammonium heptamolybdate (EMA) and 251 g of ammonium metatungstate hydrate (MTA) are added to the dispersion in order and the mixture is brought to a volume of about 1,800 ml with demineralized $H_2O$.

271 g of octylamine are diluted in 1,440 g of absolute ethanol and subsequently added to the dispersion.

The gel formed is heated, under stirring to 60° C. for 15 hours and aged at room temperature for 20 hours. The octylamine/(Ni+Mo+W) molar ratio is equal to 0.5.

630 g of gel are obtained. 50 g of gel are dried and calcined at 400° C. The solid obtained has the following molar composition $Ni_{0.15}Mo_{0.08}W_{0.08}Al_{0.06}O_{0.72}$ and contains 2.2% by weight of organic residue with respect to the total weight.

140 g of Bohemite SASOL DISPERAL P2 and 30 ml of $H_2O$ are added, under stirring at 50 rpm.

The mixture is heated to 80° C. for about 3 hours until a homogeneous paste having a consistency suitable for extrusion, is obtained. The octylamine/(Ni+Mo+W) molar ratio is equal to 0.5.

The mixture is cooled and the compound is discharged and extruded with a Hosokawa extruder of the Hutt type having a hole diameter of 1.5 mm.

The extruded product is left to age at room temperature for a night, then dried in a static oven at 90° C. for 5 hours and calcined in a flow of air with a temperature rise of 2° C./min and the following steps: 110° C. for 16 hours, 120° C. for 1 hour, 140° C. for 1 hour, 160° C. for 10 hours, 400° C. for 10 hours, in air.

The final extruded product consists of 80% by weight of mixed oxide and 20% by weight of alumina binder.

The organic residue, calculated from the weight loss between 200-600° C., measured by means of TGA analysis, is equal to 2.4% by weight with respect to the total weight of the extruded product.

The extruded product has a good mechanical resistance.

EXAMPLES 14-15

The material obtained in Example 1 and the material obtained in Example 6 by calcination at 400° C. (sample C), were used as catalysts in the following hydrotreatment catalytic test.

The fixed bed reactor is charged with 5 grams of catalyst previously pressed and granulated (20-40 mesh).

The process takes place in 2 phases: sulfidation of the catalyst and hydrotreatment step.
a) Sulfidation The catalyst is treated with a sulfiding mixture consisting of Straight Run Gasoil, with the addition of Dimethyl disulfide, so as to have a concentration of S equal to 2.5 by weight with respect to the total weight of the sulfiding mixture. The sulfidation conditions used are:
LHSV=3 hours⁻¹
P=30 bar
T=340° C.
$H_2$/sulfiding mixture=200 Nl/l.
b) Hydrotreatment The reaction is carried out under the following conditions:
T=320° C.
P=60 bar
Liquid feedstock flow-rate: 8 ml/hour
$H_2$ flow-rate: 5 Nl/hour
WHSV=1.35 hour⁻¹

The feedstock stream consists of gasoil coming from thermal cracking and contains 23,900 ppm of sulfur and 468 ppm of nitrogen. The activity of the catalysts is expressed as hydrodenitrogenation (HDN) and hydrodesulfurization (HDS) conversion.

After 120 hours, the conversion data indicated in the following table were measured:

| Example | Catalyst | HDN | HDS |
|---|---|---|---|
| 14 | Ex. 1(comparative) | 71.5 | 90.6 |
| 15 | Ex. 6 | 81.0 | 92.5 |

As is evident from comparing the results, the material of the present invention is much more active.

EXAMPLES 16-17

The sulfidation and hydrotreatment test are carried out as described for Examples 14-15.

A comparison is made of the catalysts obtained in Examples 10 and 11; the following table indicates the data measured at 320° C., after 120 hours. The activity of the catalysts is expressed as hydrodenitrogenation (HDN) and hydrodesulfurization (HDS) conversion.

| Example | Catalyst | HDN | HDS |
|---|---|---|---|
| 16 | Ex. 10 | 66.7 | 92.5 |
| 17 | Ex. 11(comparative) | 63.3 | 86.2 |

It is evident that upon increasing the content of nitrogenated compound in the synthesis, less active materials are obtained in the hydrotreatment.

EXAMPLES 18-19

The sulfidation was carried out as described for Examples 14-15. The hydrotreatment reaction is carried out under the following conditions:
T=340° C.
P=60 bar
Liquid feedstock flow-rate: 8 ml/hour
$H_2$ flow-rate: 5 Nl/hour
WHSV=1.35 hour⁻¹

The hydrocarbon feedstock used is gasoil coming from thermal cracking and contains 23,900 ppm of sulfur and 468 ppm of nitrogen.

A comparison is made of the catalysts obtained in Examples 12 and 13. The following table indicates the conversion data measured at the reaction temperature of 340° C., after 180 hours. The activity of the catalysts is expressed as hydrodenitrogenation (HDN) and hydrodesulfurization (HDS) conversion.

| Example | Catalyst | HDN | HDS |
|---------|----------|------|------|
| 18 | Ex. 12 | 99.5 | 99.5 |
| 19 | Ex. 13 | 90.6 | 98.0 |

The optimum performances of the materials of the present invention are evident.

EXAMPLE 20

The catalyst of Example 6 is sulfided as described in Examples 14-15 and used for the hydrotreatment of gasoil coming from thermal cracking which contains 23,900 ppm of sulfur and 468 ppm of nitrogen.

The hydrotreatment conditions are the following:
T=340° C.
P=60 bar
Liquid feedstock flow-rate: 8 ml/hour
$H_2$ flow-rate: 5 Nl/hour
WHSV=1.35 hour$^{-1}$ The activity of the catalyst is expressed as hydrodenitrogenation (HDN) and hydrodesulfurization (HDS) conversion.

After 180 hours at the reaction temperature of 340° C., the following conversion data are obtained:
HDS=99.5
HDN=99.4

EXAMPLE 21

5.92 g of hexylamine are dissolved in 40 g of absolute ethanol (solution C). A solution consisting of 14.89 g of nickel nitrate hexahydrate (NiNO), 4.52 g of ammonium heptamolybdate (EMA) and 6.98 g of ammonium metatungstate hydrate (MTA) dissolved in 50 ml of an aqueous sol containing 14.9 g of an aqueous dispersion of bohemite (Disperal® P2 of Sasol™) at 10% by weight (solution D) is then added under stirring to solution C. The hexylamine/(Ni+Mo+W) molar ratio is equal to 0.6.

A light green-coloured gel is formed which is left under stirring for 3 hours, heating to 70° C. It is left to rest for 48 hours. The gel obtained does not have a supernatant and is dried in an oven at 90° C. for 48 hours.

The solid obtained after calcination in air at 400° C. for 5 hours has a specific surface area of 140 m²/g, a total pore volume of 0.400 cm³/g, an average pore diameter of 7.5 nm, calculated from the desorption isotherm.

The solid obtained after calcination in air at 550° C. for 5 hours has a molar composition $Ni_{0.05}Mo_{0.03}W_{0.03}Si_{0.02}O_{0.27}$, a specific surface area of 86 m²/g, a total pore volume of 0.346 cm³/g, an average pore diameter 11.0 nm, calculated from the desorption isotherm.

The invention claimed is:

1. A mixed oxide having the formula (A):

$$X_aY_bZ_cO_d \cdot pC \qquad (A)$$

optionally shaped without a binder, wherein
X is selected from Ni, Co or a mixture thereof,
Y is selected from Mo, W or a mixture thereof,
Z is selected from Si, Al or a mixture thereof,
O is oxygen
C is selected from:
  a nitrogenated compound N,
  an organic residue deriving from the nitrogenated compound N by partial calcination, wherein said nitrogenated compound N is selected from:
a) an alkyl ammonium hydroxide of formula (I)

$$R^IR^{II}R^{III}R^{IV}NOH \qquad (I)$$

wherein the groups $R^I$, $R^{II}$, $R^{III}$ and $R^{IV}$ are the same or different and are aliphatic groups containing from 1 to 7 carbon atoms,
b) an amine of formula (II)

$$R^1R^2R^3N \qquad (II)$$

wherein
$R^1$ is a linear, branched or cyclic alkyl, containing from 4 to 12 carbon atoms, and
$R^2$ and $R^3$ are the same or different and are selected from H and a linear, branched or cyclic alkyl, containing from 4 to 12 carbon atoms, said alkyl being equal to or different from $R^1$
a, b, c, d are the number of moles of the elements X, Y, Z, O, respectively,
p is the weight percentage of C with respect to the total weight of the compound of formula (A),
a, b, c, d are greater than 0
a/b is greater than or equal to 0.3 and less than or equal to 2,
(a+b)/c is greater than or equal to 0.3 and less than or equal to 10, $$d=(2a+6b+Hc)/2$$

wherein
H=4 when Z=Si
H=3 when Z=Al
and p is greater than or equal to 0 and less than or equal to 40%.

2. The mixed oxide according to claim 1, having a formula (A1):

$$X_aY_bZ_cO_d \qquad (A1)$$

optionally shaped without a binder, wherein
X is selected from Ni, Co or a mixture thereof,
Y is selected from Mo, W or a mixture thereof,
Z is selected from Si, Al or a mixture thereof,
O is oxygen
a, b, c, d are the number of moles of the elements X, Y, Z, O, respectively and are greater than 0
a/b is greater than or equal to 0.3 and less than or equal to 2,
(a+b)/c is greater than or equal to 0.3 and less than or equal to 10, $$d=(2a+6b+Hc)/2$$

wherein
H=4 when Z=Si
H=3 when Z=Al.

3. The mixed oxide according to claim 1, having a formula (A2):

$$X_aY_bZ_cO_d \cdot pC \qquad (A2)$$

optionally shaped without a binder, wherein
X is selected from Ni, Co or a mixture thereof,
Y is selected from Mo, W or a mixture thereof,
Z is selected from Si, Al or a mixture thereof,
O is oxygen
C is selected from:
  a nitrogenated compound N,
  an organic residue deriving from the partial calcination of the nitrogenated compound N,
wherein said nitrogenated compound is selected from:
a) an alkyl ammonium hydroxide of formula (I)

$$R^IR^{II}R^{III}R^{IV}NOH \qquad (I)$$

wherein the groups $R^I$, $R^{II}$, $R^{III}$ and $R^{IV}$ are the same or different and are aliphatic groups containing from 1 to 7 carbon atoms,
b) an amine of formula (II)

$$R^1R^2R^3N \quad (II)$$

wherein
$R^1$ is a linear, branched or cyclic alkyl, containing from 4 to 12 carbon atoms and
$R^2$ and $R^3$ are the same or different and are selected from H and a linear, branched or cyclic alkyl, containing from 4 to 12 carbon atoms, said alkyl being equal to or different from $R^1$,
a, b, c, d are the number of moles of the elements X, Y, Z, O, respectively,
p is the weight percentage of C with respect to the total weight of the compound of formula (A2)
a, b, c, d are greater than 0
a/b is greater than or equal to 0.3 and less than or equal to 2,
(a+b)/c is greater than or equal to 0.3 and less than or equal to 10, $$d=(2a+6b+Hc)/2$$

wherein
H=4 when Z=Si
H=3 when Z=Al
and p is greater than 0 and less than or equal to 40%.

4. A composition comprising a mixed oxide according to claim 1, in shaped form with a binder.

5. The mixed oxide according to claim 2, mesoporous, having a surface area, determined after thermal treatment at 550° C., greater than or equal to 70 m²/g and a pore volume greater than or equal to 0.10 ml/g.

6. The mixed oxide according to claim 2, mesoporous, wherein the average pore diameter ranges from 3 to 18 nm.

7. The mixed oxide according to claim 3, mesoporous, having a surface area, determined after thermal treatment at 400° C., greater than or equal to 90 m²/g and a pore volume greater than or equal to 0.18 ml/g.

8. The mixed oxide according to claim 7, containing silicon as element Z, having a surface area greater than or equal to 100 m²/g and a pore volume greater than or equal to 0.20 ml/g.

9. The mixed oxide according to claim 7, containing aluminium as element Z, having a surface area greater than or equal to 130 m²/g and a pore volume greater than or equal to 0.30 ml/g.

10. The mixed oxide according to claim 1, wherein the nitrogenated compound of formula (I) is a tetra-alkyl ammonium hydroxide, wherein the alkyl groups, the same as each other, contain from 1 to 7 carbon atoms, or a trimethyl alkyl ammonium hydroxide, wherein the alkyl group contains from 1 to 7 carbon atoms.

11. The mixed oxide according to claim 1, wherein the nitrogenated compound of formula (II) is selected from n-hexyl amine, n-heptyl amine and n-octyl amine.

12. The mixed oxide according to claim 1, wherein X is Ni.

13. The mixed oxide according to claim 1, wherein the (a+b)/c ratio ranges from 0.8 to 10.

14. The mixed oxide according to claim 1, wherein, when X is a mixture of Ni and Co, the molar ratio Ni/Co ranges from 100/1 to 1/100, and when Y is a mixture of Mo and W the molar ratio Mo/W ranges from 100/1 to 1/100.

15. A composition comprising a mixed oxide according to claim 2, in shaped form with a binder.

16. A composition comprising a mixed oxide according to claim 3, in shaped form with a binder.

17. The mixed oxide according to claim 3, wherein the nitrogenated compound of formula (I) is a tetra-alkyl ammonium hydroxide, wherein the alkyl groups, the same as each other, contain from 1 to 7 carbon atoms, or a trimethyl alkyl ammonium hydroxide, wherein the alkyl group contains from 1 to 7 carbon atoms.

18. The mixed oxide according to claim 3, wherein the nitrogenated compound of formula (II) is selected from n-hexyl amine, n-heptyl amine and n-octyl amine.

19. The mixed oxide according to claim 2, wherein X is Ni.

20. The mixed oxide according to claim 2, wherein the (a+b)/c ratio ranges from 0.8 to 10.

21. The mixed oxide according to claim 2, wherein, when X is a mixture of Ni and Co, the molar ratio Ni/Co ranges from 100/1 to 1/100, and when Y is a mixture of Mo and W the molar ratio Mo/W ranges from 100/1 to 1/100.

22. The mixed oxide according to claim 3, wherein X is Ni.

23. The mixed oxide according to claim 3, wherein the (a+b)/c ratio ranges from 0.8 to 10.

24. The mixed oxide according to claim 3, wherein, when X is a mixture of Ni and Co, the molar ratio Ni/Co ranges from 100/1 to 1/100, and when Y is a mixture of Mo and W the molar ratio Mo/W ranges from 100/1 to 1/100.

* * * * *